J. S. CROSS.
AXLE SETTER.
APPLICATION FILED JAN. 15, 1908.
902,716.
Patented Nov. 3, 1908.
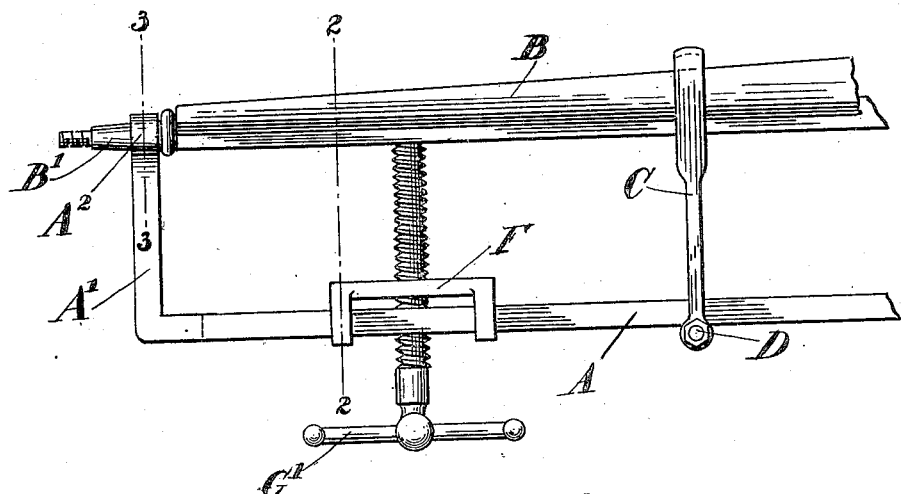
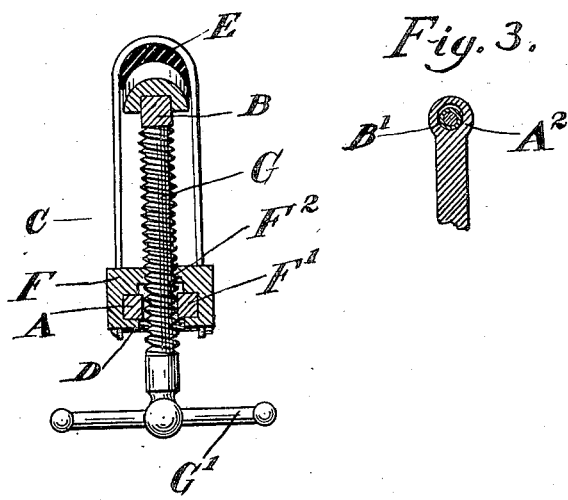
WITNESSES:
Chas T. Potts
J. A. L. Mulhall.
INVENTOR
James S. Cross.
BY
Joshua H. Potts
ATTORNEY.

UNITED STATES PATENT OFFICE.

JAMES S. CROSS, OF WAMSLEY, OHIO.

AXLE-SETTER.

No. 902,716.

Specification of Letters Patent.

Patented Nov. 3, 1908.

Application filed January 15, 1908. Serial No. 410,896.

*To all whom it may concern:*

Be it known that I, JAMES S. CROSS, a citizen of the United States, residing at Wamsley, R. F. D. No. 1, county of Adams, State of Ohio, have invented certain new and useful Improvements in Axle-Setters, of which the following is a specification.

This invention relates to axle setters, the object being, to provide a setter which can be readily attached to ordinary axle, whereby the axle can be straightened.

Another object of my invention is, to provide a setter with a pressure screw which is so arranged that it can be readily adjusted, so as to engage the axle at any point desired, so that the axle can be brought back into its normal position after it has been bent by use.

Another object of my invention is, to provide very novel means for supporting the pressure screw.

A further object of my invention is, to provide very novel means for holding the setter on the axle, whereby it can be swung into any position desired, so that the pressure screw can be brought to bear on the top, bottom, or either side of the axle.

These objects are obtained by the novel arrangement and construction of parts hereinafter fully described and shown, in the accompanying drawings, in which:

Figure 1, is a side elevational view of my improved axle setter, showing it arranged on an axle. Fig. 2, is a section taken on line 2—2 of Fig. 1, and, Fig. 3, is a section taken on line 3—3 of Fig. 1.

Referring to the drawing, A indicates a slotted bar forming the body of my improved axle setter, which is provided with an angle end A', having a sleeve A² formed at its end, adapted to fit over the spindle B' of an ordinary axle B. The other end of the bolt is supported by a yoke C which is provided with apertured ends through which extends a bolt D on which the bar A rests, the yoke being provided with a rubber pad E adapted to rest on the wooden portion of the axle B, so as to prevent the same from being scored when pressure is applied to the axle. The sleeve A² is of such size that it will revolve on the spindle B², and it will be readily seen that the bar A can be moved around the axle B as desired, as will be hereinafter fully described.

Slidably mounted on the bar A is an inverted U-shaped frame F, the depending bifurcated ends of which are longitudinally grooved as shown in F', adapted to fit over the bar A so that it can be readily moved thereon, and at the same time will be prevented from being detached by any up or down pressure on the same.

The horizontal member of the frame is provided with a threaded bore F², in which is mounted a pressure screw G, which extends through the slot in the bar A, and is provided with a lever G' at its lower end by means of which power can be applied to the screw. The other end of the screw is adapted to engage the axle at the bent portion for straightening the same.

The operation is as follows, the sleeve of the bar is placed over the spindle of the axle, it of course being understood that the wheel has been previously removed, the yoke is then placed over the axle and the free ends secured by the bolt D, the frame F is then moved along the bar A until it is in the desired position, and the screw is brought into engagement with the bent portion of the axle and by applying pressure to the lever G' the axle will be brought back into its normal position in a very few minutes.

From the foregoing description it will be seen that I have provided an axle setter which is exceedingly simple and cheap in construction, and one which can be easily and quickly placed on an axle and the pressure screw adjusted to its desired position.

Having thus described my invention what I claim as new and desire to secure by Letters Patent is,

An axle setter comprising a slotted bar having a right angle end provided with a sleeve adapted to be placed on the spindle of an axle, a yoke arranged on the axle for supporting the other end of said bar, the free ends of said yoke being connected together by a bolt upon which the bar rests, a frame having depending bifurcated ends provided with oppositely disposed grooves arranged on said bar, said frame being provided with a threaded bore in alinement with the slot of the bar, and a pressure screw mounted in said bore provided with a lever at its lower end adapted to be forced into engagement with said axle.

In testimony whereof I have signed my name to this specification in the presence of two subscribing witnesses.

JAMES S. CROSS.

Witnesses:
J. L. WATERS,
ALEX. C. WOODROW.